Sept. 17, 1935.   A. H. LAMB   2,014,387
RELAY SYSTEM
Filed June 29, 1934    3 Sheets-Sheet 1

Inventor:
Anthony H. Lamb,
By Potter, Pierce & Scheffler,
Attorneys.

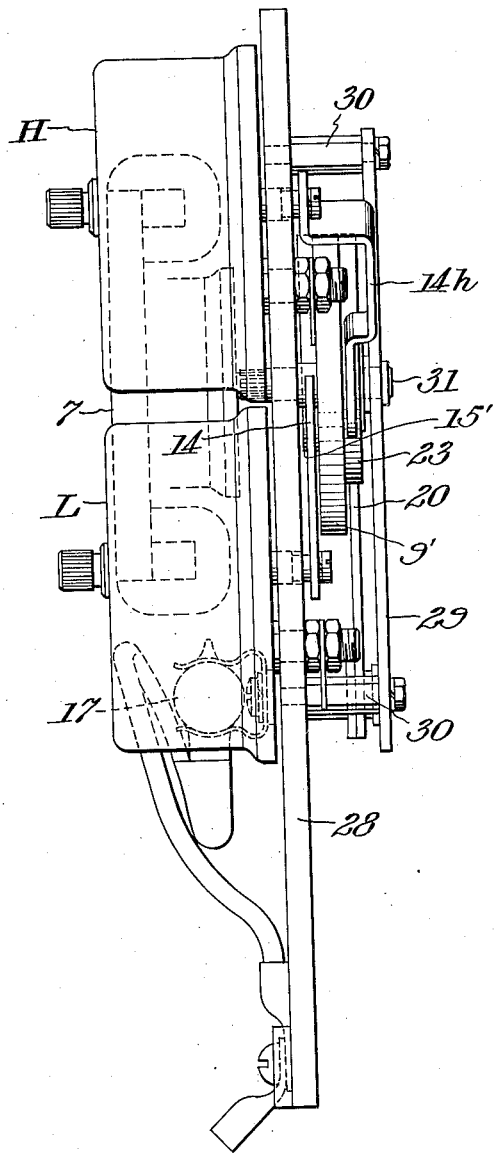

Patented Sept. 17, 1935

2,014,387

UNITED STATES PATENT OFFICE 2,014,387

RELAY SYSTEM

Anthony H. Lamb, Elizabeth, N. J., assignor to Weston Electrical Instrument Corporation, Newark, N. J., a corporation of New Jersey Application June 29, 1934, Serial No. 733,132

21 Claims. (Cl. 175—320)

This invention relates to relay systems and particularly to sensitive relay systems which include sensitive measuring instruments for regulating the flow of relatively heavy currents in control and/or alarm circuits.

Various types of relay systems have been proposed for controlling electrical equipment or alarm devices in accordance with minute variations in some measured quantity but such prior systems have been of comparatively complicated and expensive construction. The commonly used method of controlling currents of a magnitude greater than can be safely handled by a sensitive relay has been to employ one or more auxiliary or secondary relays between the sensitive relay and the controlled circuit. Batteries or transformers and rectifier systems have been used to obtain the greater sensitivity and reliability of direct current relays, but it is apparent that this general type of construction is expensive. Another system has included the use of "presser arms" for periodically obtaining a reliable contact engagement between the pointer of a sensitive measuring instrument and stationary contacts. This type of construction is expensive and, as usually constructed, is of relatively large size. A more serious objection to the presser arm type of relay system is that it does not afford a continuous control since no contacts can be established during the periods when the presser arm is raised.

In my copending applications, Ser. Nos. 688,695 and 688,696, filed September 8, 1933, I have described and claimed sensitive relay or control systems including a measuring instrument having magnetic contacts for establishing reliable contact engagements, and manually or mechanically actuated pusher mechanisms for separating the instrument contacts after their engagement has performed its intended function. According to one method of employing a relay of this magnetic pull-in type, the instrument contacts close the circuit of a small synchronous motor, such as is used in electric clocks, and the motor actuates the pusher mechanism to open the instrument contacts and also actuates a switch in the controlled or alarm circuit.

The present invention relates more particularly to a relay system which operates in this manner, and objects of the invention are to provide simple, compact and ultra-sensitive relay systems of high output capacity for use with control devices having minute power outputs, such as thermocouples, thermopiles, Wheatstone bridges, humidistats, photoelectric cells, and the like. Other objects are to provide a simple and reliable relay system including a primary relay for controlling a motor, or a plurality of primary relays for controlling the motor, and cam mechanism operated by the motor for actuating a load device and for impressing a time control upon the subsequent operation of the relay or relays. A further object is to provide a relay system including sensitive relay mechanism of the magnetic pull-in type, a motor energized by the relay for controlling a load circuit and impressing a time control upon the operation of the sensitive relay mechanism after an energization of the motor; the said controls being effected by a motor driven cam and a plurality of switches actuated thereby.

These and other objects and advantages of the invention will be apparent from the following specification when taken with the accompanying drawings in which:

Fig. 5 is a side elevation of the construction shown schematically in Fig. 3.

Figure 1:
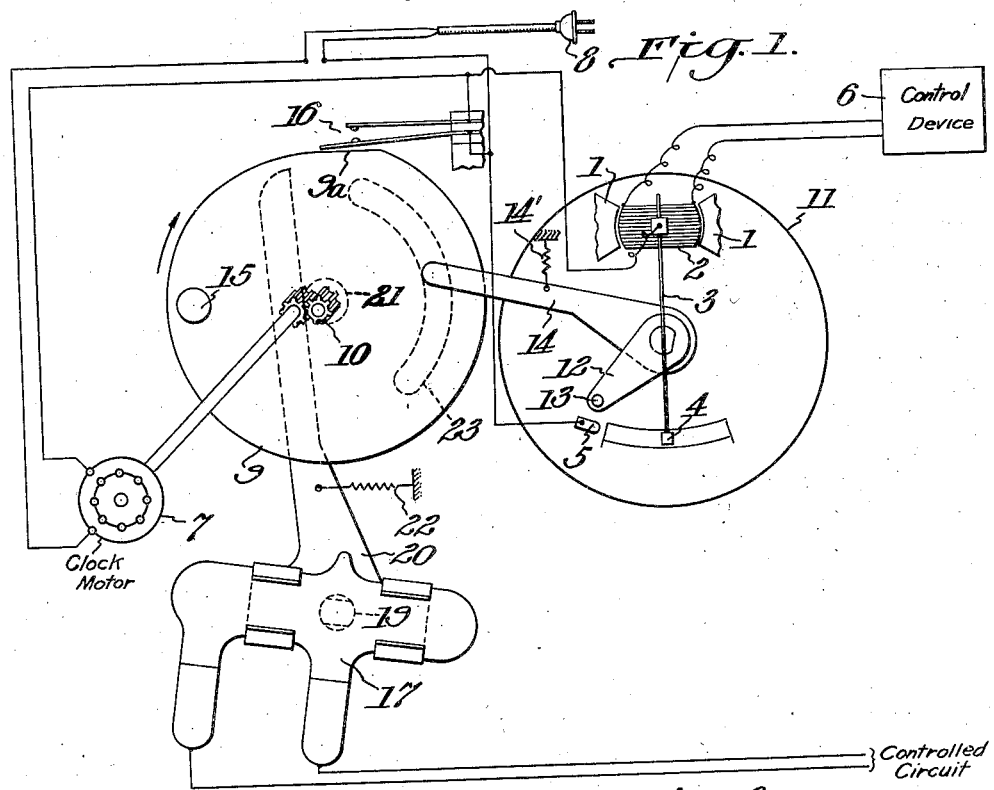
Figs. 1 and 2 are schematic views of different embodiments of the invention.

For purposes of illustration, I have shown the primary relay as an electrically operated instrument including a field structure indicated by the magnetic poles 1, and a moving system including the coil 2 and a contact arm 3, but it is to be understood that the moving system of the primary relay may respond to other factors, such as temperature, pressure, humidity and the like. As described in my prior applications, the contact arm carries a small rider 4 of magnetic material, such as soft iron, for cooperation with a relatively fixed contact 5 that takes the form of a small permanent magnet. The coil 2 is connected across a control device 6, such as a thermopile, photoelectric cell or other electric device having a variable current output upon which the control is based.

The magnetic contacts 4, 5 are series elements in the circuit between a small synchronous or clock motor 7 and a source of current which is indicated by the attachment plug 8 which may be connected to the usual 110 volt light and power circuit. A cam disk 9 is driven by the motor through reduction gearing, indicated by the single pair of gears 10, to reset the instrument contacts after an engagement thereof and to actuate a switch in a control or alarm circuit. The resetting mechanism includes a bell crank lever pivoted on the relay base 11, one lever arm 12 carrying a pin 13 for engagement with the pointer 3 and the second arm 14 extending into the path of the cam projection or pin 15 on the cam disk 9. The axis of the cam disk is parallel to the pivotal axis of the moving system and the pusher mechanism, and the cam disk is preferably located in a plane adjacent the relay base 11. A spring 14' normally retains the bell crank in such position that the pusher arm 12 lies outside the path of movement of the pointer 3.

A switch 16 is shunted across the instrument contacts 4, 5 and includes flexible contacts that are biased towards open position. The switch 16 is controlled by the rim of the cam disk 9 and, with the various parts in the normal or inoperative position shown in Fig. 1, the reduced diameter portion 9a of the cam disk is opposite the switch 16 and the switch is therefore open.

A load circuit switch 17 is mounted on, and adjacent the pivot 18 of, a lever arm 20 which extends along the rear face of the cam disk. The lever arm 20 is normally retained against a central hub 21 on the cam disk 9 by a spring 22 but may be rocked about its pivot by the arcuate cam 23 which projects from the rear face of the cam disk.

The terminals or contacts of the switch 17 are included in a control or alarm circuit of any desired design and construction. As shown in Fig. 1, the switch 17 is open under normal conditions but it will be apparent that some types of controlled circuits may require such a mounting of the control switch that it is normally closed, and is opened by the motor and cam mechanism only when the control condition, as determined by the output of the device 6, departs from normal.

The operation of the relay system may be best understood by assuming some particular use of the system, such as that of energizing an audible or visual signal in the event that the smoke from a stack exceeds the limit set by city regulations. In this case, the control device 6 will be a photoelectric cell subjected to a light beam which crosses the path of the smoke and gas in or above the stack, and the alarm device and a source of current will be included in the controlled circuit. Under normal smoke conditions, the illumination at the potoelectric cell will establish a current flow in coil 2 which holds the pointer 3 and its rider 4 away from the magnetized contact 5. When the density of the smoke exceeds the critical value, the current output of the device 6 decreases and the magnetic rider 4 approaches and is drawn into engagement with the magnetized contact 5. The motor circuit is thus closed and the cam disk 9 is rotated in a clockwise direction. The first effect of the cam disk is to close the holding switch 16 in the motor circuit as the full diameter position of the disk moves into radial alinement with the switch. Further rotation of the cam disk brings the cam pin 15 into engagement with the lever arm 14 of the pusher system to produce a rocking movement of the bell crank lever which forces the pointer 3 and contact 4 away from the contact 5. Due to the holding switch 16, the motor remains energized until the cam disk has completed one full revolution. During this rotation, the arcuate cam 23 engaged the lever 20 to rock the mercury switch 17 into closed position, and the cam then clears the lever 20 to permit the spring 22 to restore the lever 20 to its normal position, thus closing the switch 17. If the abnormal smoke condition is still present when the cam disk has completed one rotation, the instrument contacts 4, 5 are again engaged before the holding switch 16 is opened, and the rotation of the cam disk therefore continues to energize the alarm a second time. This periodic energization of the alarm continues so long as the abnormal condition persists. When normal smoke conditions are restored, the parts come to rest in the positions shown in Fig. 1 as the current output from the control device 6 will then be sufficient to hold the pointer 3 away from the contact 5.

Other uses of the relay system will be obvious to those familiar with the design and construction of relay circuits. The control device 6 may be, for example, a thermocouple in an oven or other electrically heated device, and the controlled circuit will then include a heating device or resistor for supplying heat to the oven. When the oven temperature drops below a critical point, heat energy will be intermittently supplied by the periodic closure of switch 17 until the temperature rises to its normal value.

A relay system of the type described will energize a load or alarm circuit when the value of the measured quantity departs from a normal range of values in one direction. A two direction, or "high" and "low" control requires two sets of instrument contacts, and may be provided in different ways. One method is to add a contact to a relay such as shown in Fig. 1, and another method is to employ two relays.

Figure 2:
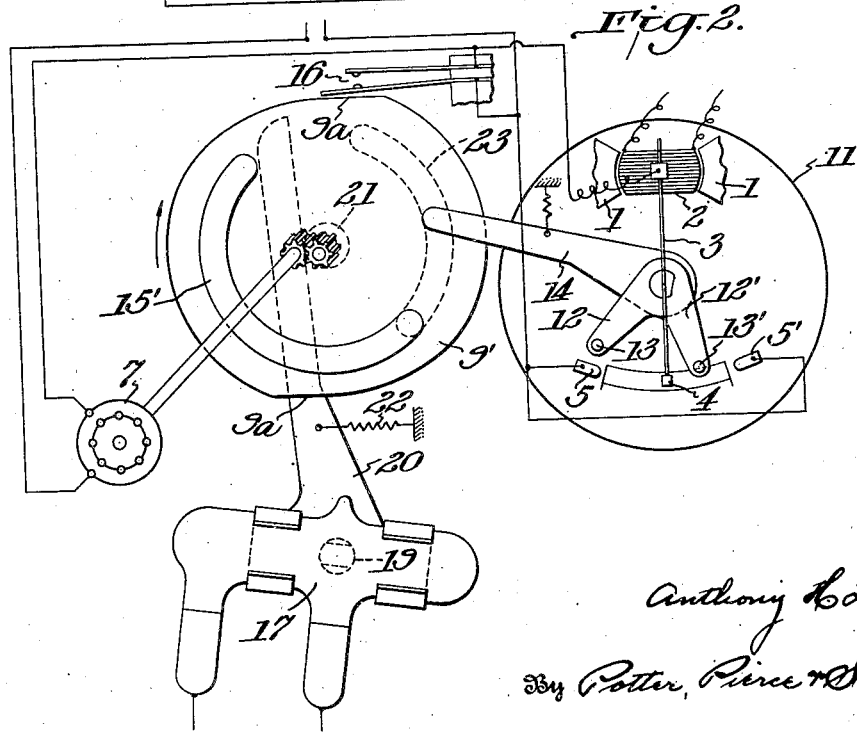

A relay system in accordance with the first of these methods is shown in Fig. 2, in which those parts which are or may be substantially identical with parts of the Fig. 1 circuit are identified by corresponding reference numerals. The relay instrument has a second contact 5' and the pusher mechanism includes a second lever arm 12' which carries a pin 13' for separating the pointer 3 and rider contact 4 from the contact 5'. The arcuate cam projection 15' which actuates the arm 14 of the pusher mechanism has a circumferential length of about 180°, and the rim of the cam disk 9' has diametrically opposed sections 9a of reduced diameter which permit the opening of holding switch 16 at each half-revolution of the cam disk. Except for the jumper connecting the magnetized contacts 5, 5' to each other, the circuit connections of this high and low control system may be identical with those of the Fig. 1 circuit.

It will be noted that the angular spacing of the pusher arms 12, 12' is such that the contact 4 on pointer 3 is forced to engage the contacts 5, 5' alternately. With the parts in the positions illustrated, the system is at rest after an engagement of contacts 4, 5' and the pin 13' prevents the pointer 3 from again approaching contact 5'. In the case of a photoelectric cell control of an illumination circuit, this condition corresponds to normal solar illumination and the contact 5' is the "high" contact. The parts will remain in the positions indicated until the illumination at the photocell falls to that critical value which results in the engagement of contacts 4, 5. The motor 7 is thus energized to rotate the cam disk 9', and the initial movement of the disk closes the holding switch 16. The motor circuit is opened at switch 16 when the cam disk has made a half revolution to aline the other reduced diameter section 9a with switch 16. This movement of the cam disk brings the cam pin 15' into engagement with the lever arm 14 to rock the arms 12, 12' counterclockwise, thus moving the pin 13 to separate the contacts 4, 5 and moving the pin 13' out of the range of movement of the pointer. At the same time, the cam 23 engages the lever 20 to rock the switch 17 into closed position, thus energizing the lighting circuit. The arm 12 comes to rest in such position that pin 13 prevents further engagement of the pointer contact 4 with the low contact 5. The parts then remain in these positions until the contact 4 is moved into the field of the magnetized contact 5' by an increase in the illumination at the photo-electric cell. When this occurs, the motor is energized, through contacts 4, 5' and then through the holding switch 16, to effect a half-revolution of the cam disk 9', thus completing one full cycle of operation of the control system to open the lighting circuit switch 17.

Figure 3:
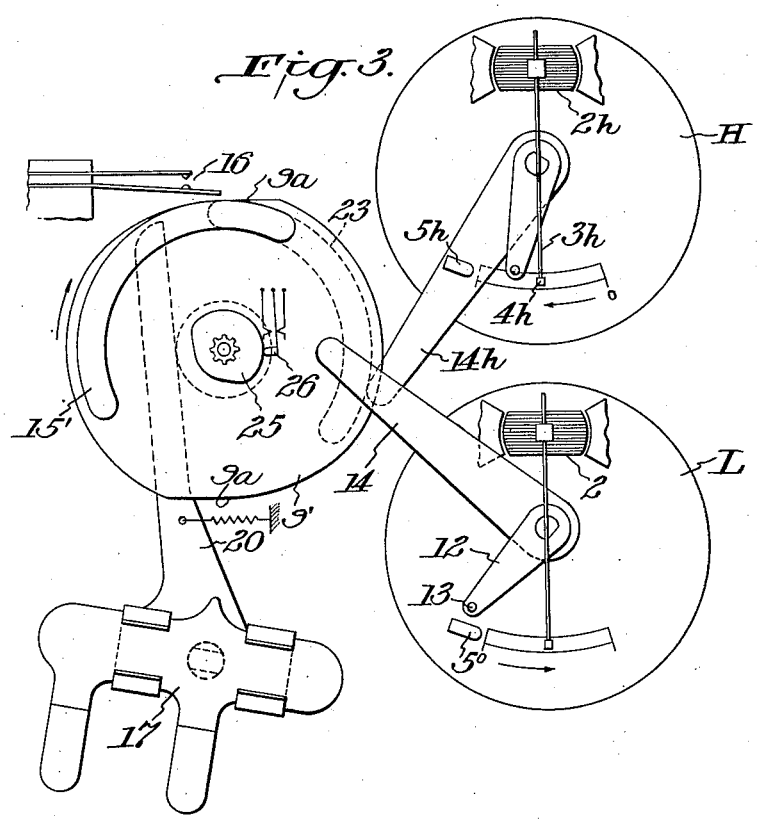
Fig. 3 is a schematic view of the physical construction of a relay system including a pair of primary relays.
Figure 4:
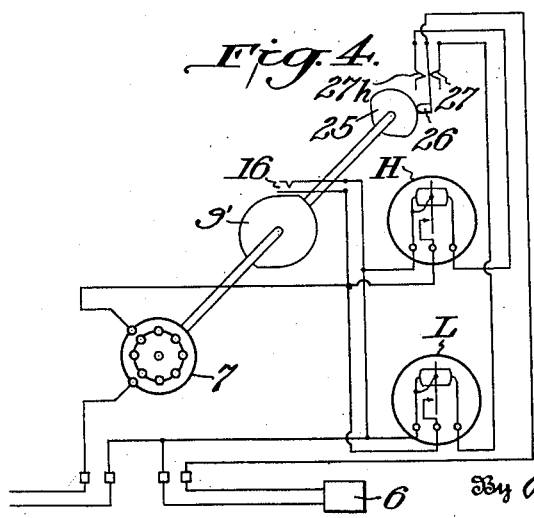
Fig. 4 is a diagram of the electrical circuits of the relay elements shown in Fig. 3.

A relay system including separate high and low relays H, L, respectively, is shown in Figs. 3, 4 and 5. The general construction of the relay instruments is, or may be, the same as illustrated in Figs. 1 and 2, and will not be described in detail, it being noted that the several elements of the relay L are identified by the reference numerals of Fig. 1, and corresponding parts of relay H are separately identified by adding the letter "h" to the reference numerals. It is to be noted that, with increasing current flow, the moving systems of the relays H and L turn in opposite directions. The relays may be of substantially identical construction as this desired difference in operation may be obtained by reversing the polarity of the permanent field magnets of the relays.

The relays are so positioned, with respect to the cam disk 9' that the lever 14 of relay L is actuated by the arcuate cam 15' while the lever 14h of relay H is actuated by the arcuate cam 23 which controls the movement of the main switch lever 20. The method of operation will be apparent from the above description of the Fig. 2 circuit, it being noted that Fig. 3 illustrates the various parts in the relative positions which they occupy when the system has come to rest after an engagement of the contacts 4h, 5h of the high relay H.

The moving systems 2, 2h of the relays may be connected in parallel across the control device 6, but, for maximum sensitivity, it is desirable to direct the entire current output of the device 6 to the relay which is to control the next movement of the cam disk. This operation is conveniently effected by a cam 25 which shifts the contact arm 26 between contacts 27h and 27. As shown in Fig. 4, one terminal of the control device 6 is connected to one pair of joined terminals of the relays H, L, and the other terminal of the device 6 is connected to the switch contact 26. The relatively fixed contacts 27h, 27 are connected to the second terminals of the high and low relays H, L, respectively.

In the physical embodiment of the invention which is shown in Fig. 5, the relays H, L are of the type described and claimed in my copending application, Ser. No. 734,679 filed July 11, 1934; and these relays, the clock motor 7, mercury switch 17 and all other parts are mounted on a panel 28 of insulating material. A subpanel 29 is spaced from the main panel by studs 30, and the shaft 31 of the cam disk 9' is rotatably supported by the panels. As illustrated, the motor 7 is mounted at the front of the panel 28 but the motor may, if desired, be placed at the rear of the main panel.

It will be noted that the described relay systems may be operated directly from an alternating current power line, without the usual auxiliary transformers, rectifiers and/or batteries which have been employed to obtain a sensitive control. As indicative of the high sensitivity and high output capacity of devices embodying the invention, it may be stated that the apparatus as illustrated in Figs. 3, 4, and 5 has been operated on an input as low as two microamperes, or of one millivolt, to control a load as high as 3 kilowatts at 110 volts. The simplicity of the construction, and its small size, are in marked contrast to the prior systems employing auxiliary relays or a presser arm type of sensitive relay.

It will be apparent that there is considerable latitude in the design and construction of relay systems embodying this invention. While the full advantages of the invention are obtained when the relay is of the magnetic pull-in type, certain advantages will be had when the relay is a relatively rugged device adapted to develop such contact pressures that the magnetic contacts are not required.

Broad claims to a relay system including a primary relay for controlling a motor, and motor driven mechanism for resetting the relay and controlling a load circuit switch are presented in my copending application Ser. No. 688,695. The claims of this application distinguish from the broad combination by restrictions to a single cam disk for actuating the relay contacts, the motor "holding" switch, and the load circuit switch or switches.

I claim:

1. In a relay system, relay means adapted to be energized by a control device and having contacts for closing a motor circuit, a motor adapted to be energized by the closure of said contacts, a holding switch for completing an energizing circuit for said motor independently of said contacts, load circuit switch means, pusher means for separating said contacts, and cam means actuated by said motor, said cam means comprising a member having a plurality of cam surfaces for actuating said pusher means and for controlling said holding switch and said load circuit switch means.

2. A relay system as claimed in claim 1, wherein said cam means comprises a cam disk having a cam surface at the rim thereof, and cam projections extending from the opposite faces of said disk.

3. A relay system as claimed in claim 1, wherein said holding switch is normally open, and the cam surface of said cam means which cooperates with said holding switch closes said holding switch before the cam surface cooperating with said pusher means actuates the latter to separate the contacts of the relay means, said cam surface cooperating with said holding switch having a single portion which corresponds to open position of said holding switch, whereby a single closure of the contacts of said relay means results in a movement of said cam means through one full cycle.

4. A relay system as claimed in claim 1, wherein said relay means includes a pair of contacts adapted to be closed when the value of the factor to which said relay means responds departs in either sense from a predetermined range of value, the cam surface of said cam means which controls said holding switch actuates the same to open position once in each half-cycle of operation of said cam means, and said pusher means includes elements for insuring alternate engagements of said pair of relay means contacts.

5. A relay system comprising a pair of relays for measuring the value of a factor, one relay having contacts adapted to close when the measured value exceeds a predetermined value and the other relay having contacts adapted to close when the measured value falls below a predetermined value, a motor having an energizing circuit which is completed by the closure of the contacts of either relay, a holding switch for said motor energizing circuit, a load circuit switch, means actuated by said motor for controlling said load circuit switch, and pusher means actuated by said motor for separating the contacts of that relay which was actuated to complete the motor energizing circuit.

6. A relay system as claimed in claim 5, wherein said relays are adapted to be actuated by a single control device of limited power output, in combination with means actuated by said motor upon the actuation of one relay to connect the other relay to the single control device.

7. In a relay system, relay means adapted to be energized by a control device and having contacts for closing a motor circuit, a motor adapted to be energized by the closure of said contacts, a holding switch for completing an energizing circuit for said motor independently of said contacts, load circuit switch means, pusher means for separating said contacts, and a cam disk rotatable by said motor; said cam disk having a plurality of cam surfaces for controlling said holding switch, said load circuit switch means and said pusher means.

8. In a relay system, relay means adapted to be energized by a control device and having contacts for closing a motor circuit, a motor adapted to be energized by the closure of said contacts, a holding switch for completing an energizing circuit for said motor independently of said contacts, load circuit switch means, pusher means for separating said contacts, and a cam disk rotatable by said motor; said cam disk having a cam surface for controlling said holding switch and a cam surface for controlling said load circuit switch means, and said pusher means includes an arm extending into the path of and actuated by one of said cam surfaces.

9. A relay system as claimed in claim 7, wherein said pusher means comprises a bell crank lever having one arm for engagement with said cam means and a second arm carrying a pin for separating the said contacts.

10. A relay system as claimed in claim 7, wherein one contact of said relay means is of magnetic material and the cooperating contact is magnetized.

11. In a relay system, the combination with an instrument type relay including a moving system carrying a magnetic contact for cooperation with a relatively stationary magnetized contact, a pivotally mounted arm for separating said contacts, and a motor having an energizing circuit adapted to be completed by an engagement of said magnetized contacts, of a load circuit switch, a holding switch for said motor circuit, and a cam disk rotatable by said motor; said cam disk having a cam surface for closing said holding switch, a cam surface operable after the closure of said holding switch to actuate said pivotally mounted arm to separate said relay contacts, and a cam surface for actuating said load circuit switch.

12. In a relay system, the combination with a relay including a moving system mounted on a base, a magnetic contact carried by said moving system; a relatively stationary magnetized contact, and a bell crank lever pivotally mounted on said base, a pusher arm of said bell crank projecting beyond said base and the other arm carrying a pin for separating said relay contacts, of a clock motor having an energizing circuit adapted to be closed by said relay contacts, a holding switch for said motor circuit, a load circuit switch, a pivotally mounted lever for actuating said load circuit switch, and cam means rotated by said motor; said cam means comprising a cam disk having one cam surface for actuating said holding switch, a second cam surface for engagement with the said pivotally mounted lever of said load circuit switch, and means for actuating the projecting arm of said bell crank lever, said cam means actuating said holding switch to closed position before said bell crank lever is actuated to open said relay contacts.

13. A relay system as claimed in claim 12, wherein said relay includes a second relatively fixed and magnetized contact spaced from the said magnetized contact, and said cam surface for actuating the holding switch includes two diametrically opposed portions for opening said holding switch; the said bell crank lever including two angularly spaced pusher arms for separating the said magnetic contact of said moving system from the respective relatively fixed magnetized contacts.

14. In a sensitive relay system of the high and low control type, a control device, a pair of relays adapted to be actuated by said control device, each relay including a moving system having a magnetic contact for cooperation with a magnetized contact, the contacts of one relay closing upon increasing output of said control device and the contacts of the other relay closing upon a predetermined decrease in the output of said control device, pusher means cooperating with each relay to separate the magnetized contacts thereof, a motor having an energizing circuit adapted to be completed by the closure of either set of relay contacts, a load circuit switch, and means actuated by said motor for operating said pusher means and for controlling said load circuit switch.

15. A relay system as claimed in claim 14, wherein said motor actuated means comprises a cam disk having a plurality of cam surfaces, in combination with a holding switch for said motor circuit, said cam disk having a pair of substantially diametrically opposed portions for opening said holding switch upon a one-half revolution of said cam disk.

16. In a relay system, a supporting panel, a relay mounted on said panel and having magnetic contacts, pusher means for separating said magnetic contacts, a motor supported on said panel and having a circuit adapted to be completed by said relay contacts, a holding switch for said motor, cam means actuated by said motor for controlling said holding switch and said pusher means, said cam means closing said holding switch before actuating said pusher means to open said relay contacts, a load circuit switch, and a cam surface on said cam means for controlling said load circuit switch.

17. In a relay system, a relay including a pair of relatively movable contacts, a motor having an energizing circuit adapted to be closed by said relay contacts, a holding switch for said motor circuit, a load circuit switch, pusher means including an element movable into the path of movement of said relatively movable relay contacts to effect a separation thereof, and a cam disk driven by said motor to actuate said pusher means to separate said relay contacts and to actuate both of said switches, said cam disk including a cam surface for closing said holding switch prior to the actuation of said pusher means.

18. A relay system as claimed in claim 17, wherein said relay comprises a base supporting a moving system having a magnetic contact for cooperation with a relatively stationary magnetized contact.

19. A relay system as claimed in claim 17, wherein said relay comprises a base supporting a moving system having a magnetic contact for cooperation with a relatively stationary magnetized contact, and said cam disk is supported for rotary movement in a plane substantially parallel to the base of said relay.

20. In a relay system, a pair of relays having contacts adapted to close a motor energizing circuit, a motor, a load circuit switch, means actuated by said motor for controlling said load circuit switch, means actuated by said motor for preventing successive closures of said motor circuit by the same relay, and means actuated by said motor to separate the contacts of that relay which last effected a closure of the motor circuit.

21. In a relay system, the combination with a source of energy of variable output, and a load circuit switch to be controlled in accordance with the output from said source of energy, of a motor circuit including a motor and a source of power for actuating the same, a pair of relays adapted to be actuated by said source of energy, each relay having a pair of contacts adapted to close the said motor circuit, means actuated by said motor for controlling said load circuit switch, and means actuated by said motor for connecting said source of energy alternately to each of the said relays.

ANTHONY H. LAMB.